United States Patent
Hu et al.

(10) Patent No.: US 9,807,658 B2
(45) Date of Patent: Oct. 31, 2017

(54) CELL HANDOVER METHOD AND APPARATUS

(71) Applicant: HUAWEI TECHNOLOGIES CO., LTD., Shenzhen, Guangdong (CN)

(72) Inventors: Zhenxing Hu, Shenzhen (CN); Jian Zhang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 2 days.

(21) Appl. No.: 14/952,136

(22) Filed: Nov. 25, 2015

(65) Prior Publication Data

US 2016/0080997 A1    Mar. 17, 2016

Related U.S. Application Data

(63) Continuation of application No. PCT/CN2013/076494, filed on May 30, 2013.

(51) Int. Cl.
*H04W 36/30* (2009.01)
*H04W 36/16* (2009.01)
(Continued)

(52) U.S. Cl.
CPC ....... *H04W 36/16* (2013.01); *H04W 36/0016* (2013.01); *H04W 36/0055* (2013.01); *H04W 36/06* (2013.01)

(58) Field of Classification Search
CPC ......... H04W 36/0016; H04W 36/0055; H04W 36/06; H04W 36/16
(Continued)

(56) References Cited

U.S. PATENT DOCUMENTS 8,295,841 B2     10/2012  Hwang et al.
2009/0274086 A1* 11/2009  Petrovic ............... H04J 11/0093
                                                      370/312
(Continued)

FOREIGN PATENT DOCUMENTS

CN     101772087 A     7/2010
CN     102378287 A     3/2012
(Continued)

OTHER PUBLICATIONS

International Search Report, dated Feb. 27, 2014, in corresponding International Application No. PCT/CN2013/076494 (4 pp.).
(Continued)

*Primary Examiner* — Nathan Taylor
(74) *Attorney, Agent, or Firm* — Staas & Halsey LLP

(57) ABSTRACT

The present invention belongs to the field of communications, and discloses a cell handover method and a device. The method includes: determining, by a first base station to which a primary carrier cell belongs and according to a measurement report sent by user equipment UE, whether soft handover needs to be performed for the UE; if soft handover needs to be performed for the UE, transferring, by the first base station, a radio bearer RB between the first base station and the UE to a second base station to which a secondary carrier cell belongs; and selecting, by the first base station, a target cell according to the measurement report, and handing over the UE to a target base station to which the target cell belongs. The present invention can avoid service interruption caused when cell handover is performed for UE.

12 Claims, 5 Drawing Sheets

(51) Int. Cl.
*H04W 36/00* (2009.01)
*H04W 36/06* (2009.01)

(58) Field of Classification Search
USPC .......................................... 455/442; 370/252
See application file for complete search history.

(56) References Cited

U.S. PATENT DOCUMENTS

| | | | | |
|---|---|---|---|---|
| 2009/0310563 | A1* | 12/2009 | Chou | H04L 27/0006 370/331 |
| 2010/0022250 | A1* | 1/2010 | Petrovic | H04J 11/0093 455/450 |
| 2010/0222059 | A1* | 9/2010 | Pani | H04W 72/0453 455/436 |
| 2011/0021197 | A1* | 1/2011 | Ngai | H04W 36/30 455/436 |
| 2012/0106510 | A1* | 5/2012 | Kuo | H04W 76/064 370/331 |
| 2012/0289231 | A1* | 11/2012 | Balachandran | H04W 76/025 455/436 |
| 2012/0302245 | A1 | 11/2012 | Huang | |
| 2013/0165124 | A1* | 6/2013 | Liang | H04W 36/0061 455/437 |
| 2013/0170474 | A1* | 7/2013 | Bi | H04W 36/0055 370/332 |
| 2013/0215772 | A1* | 8/2013 | Kaur | H04W 36/0072 370/252 |
| 2015/0304891 | A1* | 10/2015 | Dinan | H04W 36/0077 370/331 |

FOREIGN PATENT DOCUMENTS

| | | |
|---|---|---|
| CN | 102457917 A | 5/2012 |
| EP | 1 909 523 A1 | 4/2008 |
| EP | 2 605 590 A1 | 6/2013 |
| WO | 2011/156769 A1 | 12/2011 |
| WO | 2012/019549 A1 | 2/2012 |

OTHER PUBLICATIONS

International Search Report dated Feb. 27, 2014 in corresponding International Patent Application No. PCT/CN2013/07694.
Extended European Search Report dated Apr. 7, 2016 in corresponding European Patent Application No. 13886022.6.

* cited by examiner

US 9,807,658 B2

CELL HANDOVER METHOD AND APPARATUS

CROSS REFERENCE

This application is a continuation of International Application No. PCT/CN2013/076494, filed on May 30, 2013, which is hereby incorporated by reference in its entirety.

TECHNICAL FIELD

The present invention relates to the field of communications, and in particular, to a cell handover method and an apparatus.

BACKGROUND

On a wireless communications network, UE (User Equipment, user equipment) selects a cell for accessing, and exchanges data with the wireless communications network by using the accessed cell. Many UEs are mobile, and when UE moves from coverage of a cell accessed by the UE to coverage of another cell, the UE requires cell handover to access the another cell.

Currently, the prior art provides a cell handover method, which may be: sending, by UE, a measurement report to a source base station to which a source cell accessed by the UE belongs; when determining, according to the measurement report, that cell handover needs to be performed, selecting, by the source base station, a target cell for the UE, sending a handover request message to a target base station to which the target cell belongs, receiving a handover request acknowledgement message sent by the target base station, and sending an RRC (Radio Resource Control, Radio Resource Control) connection reconfiguration message to the UE, where the RRC connection reconfiguration message carries an identifier of the target cell; and receiving, by the UE, the RRC connection reconfiguration message, disconnecting from the source base station, establishing a connection to the target base station according to the identifier of the target cell, and accessing the target cell. In this way, the UE is handed over from the source cell to the target cell.

In a process of implementing the present invention, it is found that the prior art has at least the following problem:

In a process of handover from the source cell to the target cell, the UE needs to disconnect from the source base station, but at this moment, the connection between the UE and the target base station has not been established; therefore, data transmission between the UE and a network side is interrupted, thereby causing service interruption.

SUMMARY

To avoid service interruption caused when cell handover is performed for UE, the present invention provides a cell handover method and an apparatus. The technical solutions are as follows:

According to a first aspect, a cell handover method is provided, where the method includes:

determining, by a first base station to which a first cell belongs, to perform soft handover for user equipment UE, and selecting a cell as a target cell for the UE, where the first cell is a primary carrier cell of the UE;

transferring, by the first base station, a radio bearer RB between the first base station and the UE to a second base station to which a second cell belongs, where the second cell is a secondary carrier cell of the UE;

sending, by the first base station, an identifier of the RB transferred to the second base station and an identifier of the second cell to the UE, so that the UE determines to transmit a service by using the second base station; and in a case in which the UE maintains the RB with the second cell, handing over, by the first base station, the UE to the target cell.

With reference to the first aspect, in a first possible implementation manner of the first aspect, the transferring, by the first base station, a radio bearer RB between the first base station and the UE to a second base station to which a second cell belongs includes:

sending, by the first base station, RB transfer information to the second base station, where the RB transfer information carries RB configuration information of the RB between the first base station and the UE, so that the second base station establishes an RB between the second base station and the UE according to the RB transfer information, to implement transfer of the RB between the first base station and the UE to the second base station.

With reference to the first aspect or the first possible implementation manner of the first aspect, in a second possible implementation manner of the first aspect, the sending, by the first base station, an identifier of the RB transferred to the second base station and an identifier of the second cell to the UE includes:

sending, by the first base station, an RB reconfiguration message to the UE, where the RB reconfiguration message carries the identifier of the RB transferred to the second base station and the identifier of the second cell, so that the UE determines, according to the RB reconfiguration message, to transmit a service by using the second base station; or sending, by the first base station, a Media access control layer control element MAC CE to the UE, where the MAC CE carries the identifier of the RB transferred to the second base station and the identifier of the second cell, so that the UE determines, according to the MAC CE, to transmit a service by using the second base station.

With reference to the second possible implementation manner of the first aspect, in a third possible implementation manner of the first aspect, the sending, by the first base station, an RB reconfiguration message to the UE includes:

sending, by the first base station, the RB reconfiguration message to the second base station, so that the second base station forwards the RB reconfiguration message to the UE.

With reference to the first aspect or any one of the first to third possible implementation manners of the first aspect, in a fourth possible implementation manner of the first aspect, after the first base station notifies the UE of the RB transferred to the second base station, the method further includes:

sending, by the first base station to the second base station, downlink data that has not been sent to the UE, so that the second base station forwards the downlink data to the UE; and/or receiving, by the first base station, uplink data sent by the second base station, where the uplink data is uplink data sent by the UE and received by the second base station.

With reference to the first aspect or any one of the first to fourth possible implementation manners of the first aspect, in a fifth possible implementation manner of the first aspect, after the handing over, by the first base station, the UE to the target cell, the method further includes:

sending, by the first base station, a primary carrier redirect message to the second base station, where the primary carrier redirect message carries an identifier of the target cell, so that the second base station uses the target cell as a primary carrier cell.

With reference to the first aspect or any one of the first to fifth possible implementation manners of the first aspect, in a sixth possible implementation manner of the first aspect, before the determining, by a first base station, to perform soft handover for user equipment UE, the method further includes:

receiving, by the first base station, a measurement report sent by the UE and forwarded by the second base station, where the measurement report includes at least signal quality of a cell that can cover the UE; and the determining, by a first base station, to perform soft handover for user equipment UE includes:

determining, by the first base station according to the measurement report, to perform soft handover for the UE.

According to a second aspect, a cell handover method, where the method includes:

determining, by a first base station to which a first cell belongs, to switch a role of a second cell and a role of the first cell, where the first cell is a primary carrier cell of the UE, and the second cell is a secondary carrier cell of the UE;

sending, by the first base station, a radio bearer RB reconfiguration message to the UE, where the RB reconfiguration message carries a role switchover indication, so that according to the RB reconfiguration message, the UE determines the first cell as a secondary carrier cell and determines the second cell as a primary carrier cell; and sending, by the first base station, a role switchover message to a second base station to which the second cell belongs, so that the second base station transfers a path between the first base station and a core network to the second base station according to the role switchover message, to hand over the UE from the first cell to the second cell.

With reference to the second aspect, in a first possible implementation manner of the second aspect, after the sending, by the first base station, a role switchover message to a second base station to which the second cell belongs, the method further includes:

sending, by the first base station to the second base station, uplink data of the UE that has not been sent, so that the second base station forwards the uplink data to the core network.

With reference to the second aspect or the first possible implementation manner of the second aspect, in a second possible implementation manner of the second aspect, after the sending, by the first base station, a role switchover message to a second base station to which the second cell belongs, the method further includes:

receiving, by the first base station, a request message that is sent by the second base station after determining to delete the first cell and that is used to acquire an RB; and sending, by the first base station, RB configuration information of an RB between the first base station and the UE to the second base station, so that the second base station establishes an RB between the second base station and the UE according to the RB configuration information of the RB between the first base station and the UE.

According to a third aspect, a base station is provided, where the base station is a first base station to which a first cell belongs, the first cell is a primary carrier cell of user equipment UE, and the base station includes:

a determining unit, configured to determine to perform soft handover for the user equipment UE, and select a cell as a target cell for the UE;

a transfer unit, configured to: after the determining unit determines to perform soft handover for the UE, transfer a radio bearer RB between the first base station and the UE to a second base station to which a second cell belongs, where the second cell is a secondary carrier cell of the UE;

a sending unit, configured to send an identifier of the RB transferred to the second base station by the transfer unit and an identifier of the second cell to the UE, so that the UE determines to transmit a service by using the second base station; and a handover unit, configured to: in a case in which the UE maintains the RB with the second cell, hand over the UE to the target cell determined by the determining unit.

With reference to the third aspect, in a first possible implementation manner of the third aspect, the transfer unit is configured to send RB transfer information to the second base station, where the RB transfer information carries RB configuration information of the RB between the first base station and the UE, so that the second base station establishes an RB between the second base station and the UE according to the RB transfer information, to implement transfer of the RB between the first base station and the UE to the second base station.

With reference to the third aspect or the first possible implementation manner of the third aspect, in a second possible implementation manner of the third aspect, the sending unit is configured to send an RB reconfiguration message to the UE, where the RB reconfiguration message carries the identifier of the RB transferred to the second base station and the identifier of the second cell, so that the UE determines, according to the RB reconfiguration message, to transmit a service by using the second base station; or the sending unit is configured to send a Media access control layer control element MAC CE to the UE, where the MAC CE carries the identifier of the RB transferred to the second base station and the identifier of the second cell, so that the UE determines, according to the MAC CE, to transmit a service by using the second base station.

With reference to the second possible implementation manner of the third aspect, in a third possible implementation manner of the third aspect, the sending unit is configured to send the RB reconfiguration message to the second base station, so that the second base station forwards the RB reconfiguration message to the UE.

With reference to the third aspect or any one of the first to third possible implementation manners of the third aspect, in a fourth possible implementation manner of the third aspect, the sending unit is further configured to send, to the second base station, downlink data that has not been sent to the UE, so that the second base station forwards the downlink data to the UE; and/or the base station further includes:

a receiving unit, configured to receive uplink data sent by the second base station, where the uplink data is uplink data sent by the UE and received by the second base station.

With reference to the third aspect or any one of the first to fourth possible implementation manners of the third aspect, in a fifth possible implementation manner of the third aspect, the sending unit is further configured to send a primary carrier redirect message to the second base station, where the primary carrier redirect message carries an identifier of the target cell, so that the second base station uses the target cell as a primary carrier cell.

With reference to the third aspect or any one of the first to fifth possible implementation manners of the third aspect, in a sixth possible implementation manner of the third aspect, the base station further includes:

the receiving unit, configured to receive a measurement report sent by the UE and forwarded by the second base station, where the measurement report includes at least signal quality of a cell that can cover the UE; and the determining unit is configured to determine, according to the measurement report, to perform soft handover for the UE.

According to a fourth aspect, a base station, where the base station is a first base station to which a first cell belongs, the first cell is a primary carrier cell of user equipment UE, and the base station includes:

a determining unit, configured to determine to switch a role of a second cell and a role of the first cell, where the second cell is a secondary carrier cell of the UE; and a sending unit, configured to: after the determining unit determines to switch the role of the second cell and the role of the first cell, send a radio bearer RB reconfiguration message to the UE, where the RB reconfiguration message carries a role switchover indication, so that according to the RB reconfiguration message, the UE determines the first cell as a secondary carrier cell and determines the second cell as a primary carrier cell, where the sending unit is further configured to send a role switchover message to a second base station to which the second cell belongs, so that the second base station transfers a path between the first base station and a core network to the second base station according to the role switchover message, to hand over the UE from the first cell to the second cell.

With reference to the fourth aspect, in a first possible implementation manner of the fourth aspect, the sending unit is further configured to send, to the second base station, uplink data of the UE that has not been sent, so that the second base station forwards the uplink data to the core network.

With reference to the fourth aspect or the first possible implementation manner of the fourth aspect, in a second possible implementation manner of the fourth aspect, the base station further includes:

a receiving unit, configured to receive a request message that is sent by the second base station after determining to delete the first cell and that is used to acquire an RB, where the sending unit is further configured to send RB configuration information of an RB between the first base station and the UE to the second base station, so that the second base station establishes an RB between the second base station and the UE according to the RB configuration information of the RB between the first base station and the UE.

According to a fifth aspect, a base station, where the base station is a first base station to which a first cell belongs, the first cell is a primary carrier cell of user equipment UE, and the base station includes:

a processor, configured to determine to perform soft handover for the user equipment UE, and select a cell as a target cell for the UE; and transfer a radio bearer RB between the first base station and the UE to a second base station to which a second cell belongs, where the second cell is a secondary carrier cell of the UE; and a transmitter, configured to send an identifier of the RB transferred to the second base station by the processor and an identifier of the second cell to the UE, so that the UE determines to transmit a service by using the second base station, where the processor is further configured to hand over the UE to the target cell.

With reference to the fifth aspect, in a first possible implementation manner of the fifth aspect, the processor is configured to send RB transfer information to the second base station, where the RB transfer information carries RB configuration information of the RB between the first base station and the UE, so that the second base station establishes an RB between the second base station and the UE according to the RB transfer information, to implement transfer of the RB between the first base station and the UE to the second base station.

With reference to the fifth aspect or the first possible implementation manner of the fifth aspect, in a second possible implementation manner of the fifth aspect, the transmitter is configured to send an RB reconfiguration message to the UE, where the RB reconfiguration message carries the identifier of the RB transferred to the second base station and the identifier of the second cell, so that the UE determines, according to the RB reconfiguration message, to transmit a service by using the second base station; or the transmitter is configured to send a Media access control layer control element MAC CE to the UE, where the MAC CE carries the identifier of the RB transferred to the second base station and the identifier of the second cell, so that the UE determines, according to the MAC CE, to transmit a service by using the second base station.

With reference to the second possible implementation manner of the fifth aspect, in a third possible implementation manner of the fifth aspect, the transmitter is configured to send the RB reconfiguration message to the second base station, so that the second base station forwards the RB reconfiguration message to the UE.

With reference to the fifth aspect or any one of the first to third possible implementation manners of the fifth aspect, in a fourth possible implementation manner of the fifth aspect, the transmitter is further configured to send, to the second base station, downlink data that has not been sent to the UE, so that the second base station forwards the downlink data to the UE; and/or the base station further includes:

a receiver, configured to receive uplink data sent by the second base station, where the uplink data is uplink data sent by the UE and received by the second base station.

With reference to the fifth aspect or any one of the first to fourth possible implementation manners of the fifth aspect, in a fifth possible implementation manner of the fifth aspect, the transmitter is further configured to send a primary carrier redirect message to the second base station, where the primary carrier redirect message carries an identifier of the target cell, so that the second base station uses the target cell as a primary carrier cell.

With reference to the fifth aspect or any one of the first to fifth possible implementation manners of the fifth aspect, in a sixth possible implementation manner of the fifth aspect, the base station further includes:

the receiver, configured to receive a measurement report sent by the UE and forwarded by the second base station, where the measurement report includes at least signal quality of a cell that can cover the UE; and the processor is configured to determine, according to the measurement report, to perform soft handover for the UE.

According to a sixth aspect, a base station, where the base station is a first base station to which a first cell belongs, the first cell is a primary carrier cell of user equipment UE, and the base station includes:

a processor, configured to determine to switch a role of a second cell and a role of the first cell, where the first cell is a primary carrier cell of the UE, and the second cell is a secondary carrier cell of the UE; and a transmitter, configured to: after the processor determines to switch the role of the second cell and the role of the first cell, send a radio bearer RB reconfiguration message to the UE, where the RB reconfiguration message carries a role switchover indication, so that according to the RB reconfiguration message, the UE determines the first cell as a secondary carrier cell and determines the second cell as a primary carrier cell, where the transmitter is further configured to send a role switchover message to a second base station to which the second cell belongs, so that the second base station transfers a path between the first base station and a core network to the second base station according to the role switchover message, to hand over the UE from the first cell to the second cell.

With reference to the sixth aspect, in a first possible implementation manner of the sixth aspect, the transmitter is further configured to send, to the second base station, uplink data of the UE that has not been sent, so that the second base station forwards the uplink data to the core network.

With reference to the sixth aspect or the first possible implementation manner of the sixth aspect, in a second possible implementation manner of the sixth aspect, the base station further includes:

a receiver, configured to receive a request message that is sent by the second base station after determining to delete the first cell and that is used to acquire an RB, where the transmitter is further configured to send RB configuration information of an RB between the first base station and the UE to the second base station, so that the second base station establishes an RB between the second base station and the UE according to the RB configuration information of the RB between the first base station and the UE.

In embodiments of the present invention, a first base station to which a primary carrier cell belongs transfers an RB between the first base station and UE to a second base station to which a secondary carrier cell belongs; sends an identifier of the RB transferred to the second base station and an identifier of the second cell to the UE, so that the UE determines to transmit a service by using the second base station; and hands over the UE to a target cell. Before the UE is handed over to the target cell, the RB between the first base station and the UE is first transferred to the second base station; therefore, in a process in which the UE is handed over to the target cell, interruption of data transmission between the UE and a network side is avoided, thereby avoiding service interruption.

BRIEF DESCRIPTION OF DRAWINGS

FIG. 2-1 is a schematic diagram of a network architecture according to an embodiment of the present invention;

FIG. 2-2 is a flowchart of another cell handover method according to an embodiment of the present invention;

DESCRIPTION OF EMBODIMENTS

To make the objectives, technical solutions, and advantages of the present invention clearer, the following further describes the embodiments of the present invention in detail with reference to the accompanying drawings.

An embodiment of the present invention provides a cell handover method, including:

Step 101: A first base station to which a first cell belongs determines to perform soft handover for UE, and selects a cell as a target cell for the UE, where the first cell is a primary carrier cell of the UE.

Step 102: The first base station transfers an RB (Radio Bear, radio bearer) between the first base station and the UE to a second base station to which a second cell belongs, where the second cell is a secondary carrier cell of the UE.

Step 103: The first base station sends an identifier of the RB transferred to the second base station and an identifier of the second cell to the UE, so that the UE determines to transmit a service by using the second base station.

Step 104: In a case in which the UE maintains the RB with the second cell, the first base station hands over the UE to the target cell.

In this embodiment of the present invention, a first base station to which a primary carrier cell belongs transfers an RB between the first base station and UE to a second base station to which a secondary carrier cell belongs; sends an identifier of the RB transferred to the second base station and an identifier of the second cell to the UE, so that the UE determines to transmit a service by using the second base station; and hands over the UE to a target cell. Before the UE is handed over to the target cell, the RB between the first base station and the UE is first transferred to the second base station; therefore, in a process in which the UE is handed over to the target cell, a service of the UE can continue in the secondary carrier cell, which avoids interruption of data transmission between the UE and a network side, thereby avoiding service interruption.

An embodiment of the present invention provides a cell handover method.

Figure 1:
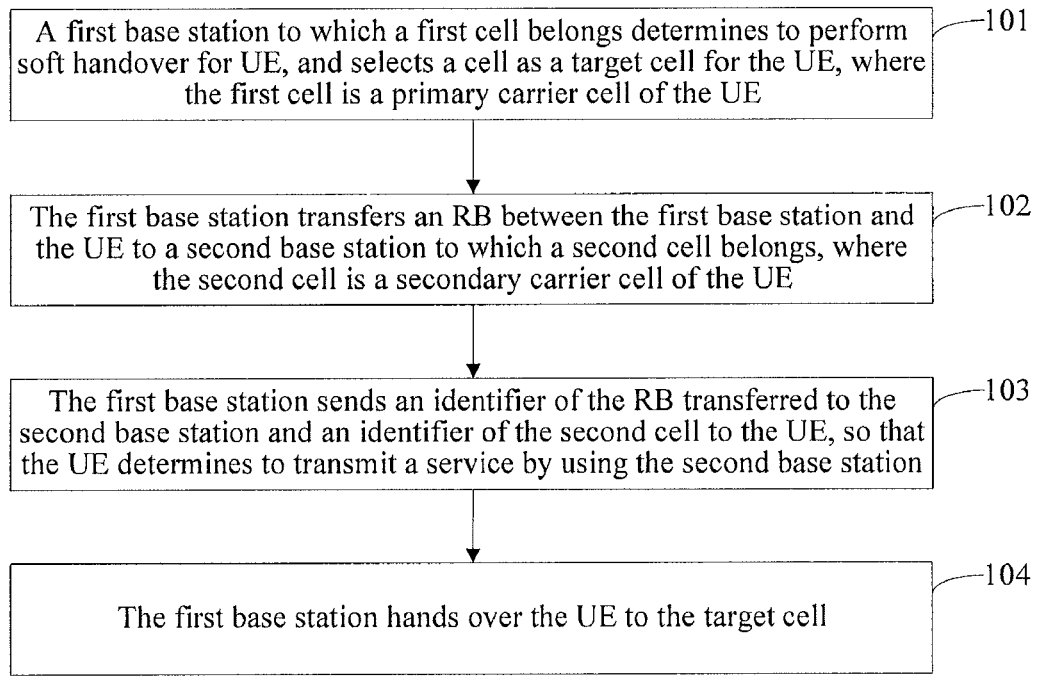
FIG. 1 is a flowchart of a cell handover method according to an embodiment of the present invention.
Figures 1, 2:
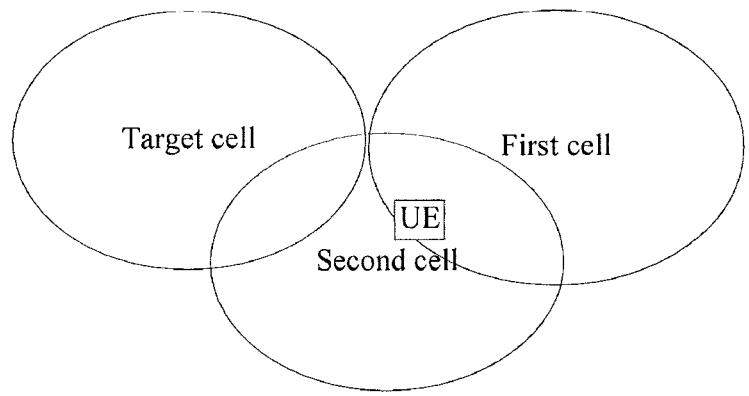
Figure 2:
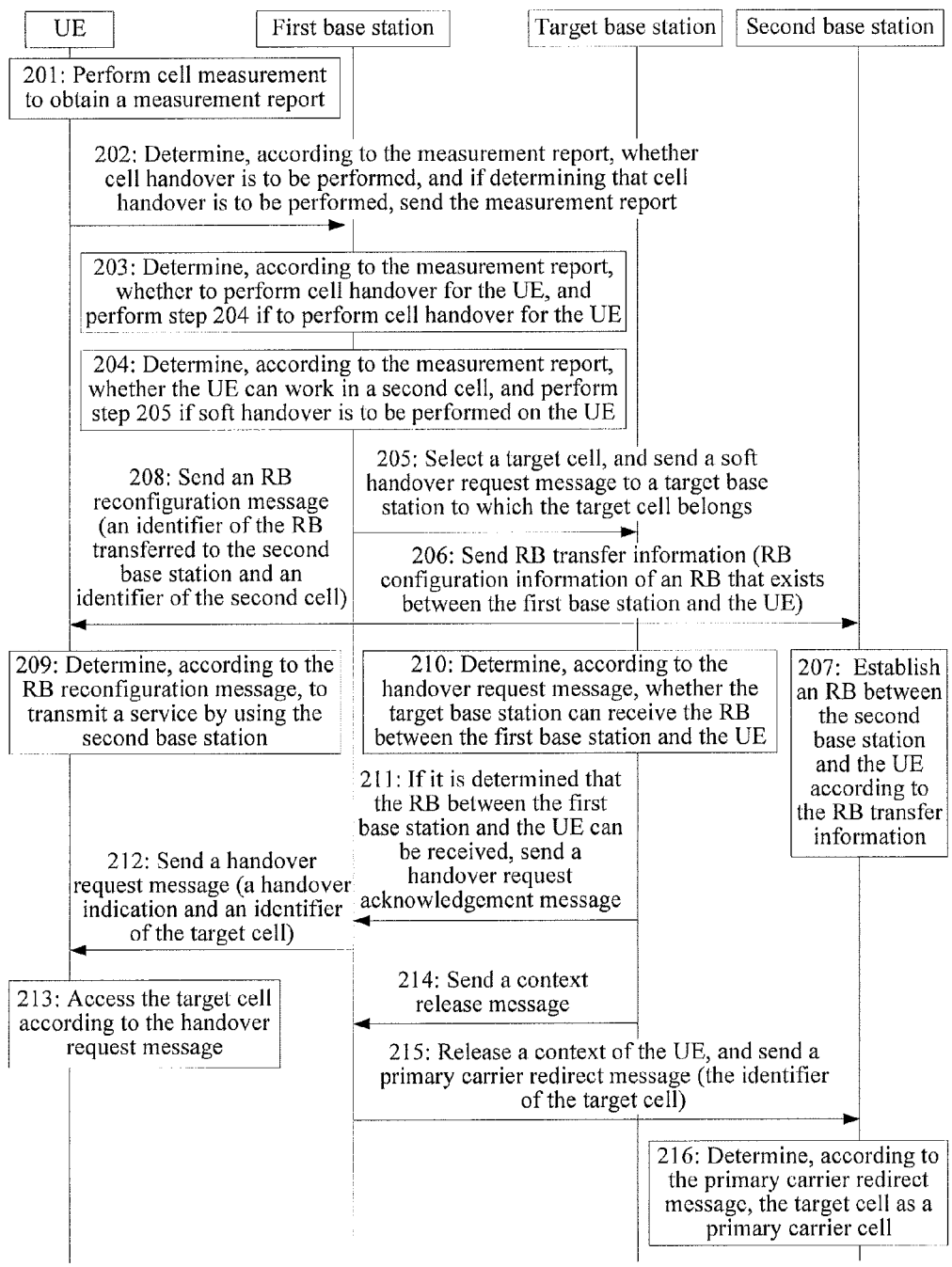

FIG. 2-1 shows a network scenario in which this embodiment of the present invention is applied. In this network scenario, UE first accesses a first cell and establishes an RB between the UE and a first base station to which the first cell belongs. The UE moves in coverage of the first cell, and when the UE moves to a location at which signal quality of a second cell satisfies a specific condition, the UE accesses the second cell, and establishes an RB between the UE and a second base station to which the second cell belongs. In this case, the first cell is used as a primary carrier cell of the UE, the second cell is used as a secondary carrier cell of the UE, and the UE enters a CA (Carrier Aggregation, carrier aggregation) working state.

After the UE enters the CA working state, when the UE needs to send uplink data to the first base station, the UE may send the uplink data to the first base station by using the RB between the UE and the first base station, and the first base station receives the uplink data by using the RB between the first base station and the UE; or the UE may send the uplink data to the second base station by using the RB between the UE and the second base station, the second base station receives the uplink data and forwards the uplink data to the first base station, and then the first base station receives the uplink data. When the first base station needs to send downlink data to the UE, the first base station may send the downlink data to the UE by using the RB between the first base station and the UE, and the UE receives the downlink data by using the RB between the UE and the first base station; or the first base station sends the downlink data to the second base station, the second base station receives the downlink data and sends the downlink data to the UE by using the RB between the second base station and the UE, and the UE receives the downlink data by using the RB between the UE and the second base station.

The UE continues to move in the coverage of the first cell, quality of a signal received from the first base station may gradually decrease during the movement, and when the quality decreases to an extent that cell handover needs to be performed, cell handover is performed according to the following procedure of the method. Referring to FIG. 2-2, the procedure of the method includes:

Step 201: UE performs cell measurement to obtain a measurement report, where the measurement report includes signal quality of a first cell, signal quality of a second cell, and an identifier and signal quality of another cell that can cover the UE.

Specifically, the UE periodically measures the first cell and the second cell that are accessed by the UE and the another cell that can cover the UE, and generates a measurement report, where the measurement report includes the signal quality of the first cell, the signal quality of the second cell, and the identifier and the signal quality of the another cell that can cover the UE.

Step 202: The UE determines, according to the measurement report, whether cell handover needs to be performed, and if it is determined that cell handover needs to be performed, the UE sends the measurement report to a first base station.

Specifically, the UE determines, according to the measurement report, whether the signal quality of the first cell is less than a first preset threshold; and if the signal quality of the first cell is less than the first preset threshold, the UE determines that cell handover needs to be performed, or if the signal quality of the first cell is greater than or equal to the first preset threshold, the UE determines that cell handover does not need to be performed.

The UE may directly send the measurement report to the first base station by using an RB that exists between the UE and the first base station.

If the signal quality of the first cell obtained by measurement by the UE so poor at this moment that the UE already cannot directly send the measurement report to the first base station by using the RB between the UE and the first base station, because the UE is still in the coverage of the second cell, the UE may send the measurement report to a second base station by using an RB between the UE and the second base station, and the second base station receives the measurement report and sends the measurement report to the first base station.

Step 203: The first base station receives the measurement report, determines, according to the measurement report, whether cell handover needs to be performed for the UE, and performs step 204 if cell handover needs to be performed for the UE.

Specifically, the first base station receives the measurement report, and determines whether the signal quality of the first cell is less than the first preset threshold; and if the signal quality of the first cell is less than the first preset threshold, the first base station determines that a status of a channel between the UE and the first base station is relatively poor at present and that cell handover needs to be performed for the UE; or if the signal quality of the first cell is greater than or equal to the first preset threshold, the first base station determines that a status of a channel between the UE and the first base station is relatively desirable at present and that cell handover does not need to be performed for the UE.

If it is determined that cell handover does not need to be performed for the UE, the operation ends.

Step 204: The first base station determines, according to the measurement report, whether to perform soft handover for the UE, and performs step 205 if to perform soft handover for the UE.

Specifically, the first base station determines, according to the measurement report, whether the UE can continue to work in the second cell; and if the UE can continue to work in the second cell, the first base station determines to perform soft handover for the UE; or if the UE cannot continue to work in the second cell, the first base station determines not to perform soft handover for the UE.

If the first base station determines not to perform soft handover for the UE, the first base station performs cell handover for the UE according to an existing cell handover method, which is not described in detail herein again.

The determining, by the first base station according to the measurement report, whether the UE can continue to work in the second cell may be:

determining, by the first base station, whether the signal quality of the second cell included in the measurement report is greater than or equal to a second preset threshold; and if the signal quality of the second cell is greater than or equal to the second preset threshold, determining that the UE can continue to work in the second cell; or if the signal quality of the second cell is less than the second preset threshold, determining that the UE cannot continue to work in the second cell.

Step 205: The first base station selects a target cell for the UE according to the measurement report, and sends a soft handover request message to a target base station to which the target cell belongs, where the soft handover request message carries a soft handover indication.

The soft handover request message may further carry an identifier of the second cell.

Step 206: The first base station sends RB transfer information to a second base station to which the second cell belongs, where the RB transfer information carries RB configuration information of an RB that exists between the first base station and the UE.

Further, the RB transfer information may further carry a synchronization time.

Step 207: The second base station receives the RB transfer information, and transfers the RB between the UE and the first base station to the second base station according to the RB transfer information.

Specifically, the second base station receives the RB transfer information, and establishes an RB between the second base station and the UE according to the RB configuration information, carried in the RB transfer information, of the RB that exists between the first base station and the UE, to implement transfer of the RB between the UE and the first base station to the second base station.

Preferably, after receiving the RB transfer information, the second base station may further determine whether the second base station can accept the RB between the first base station and the UE, and send a determining result to the first base station, which may be as follows:

the second base station acquires load of the second cell, and determines whether the load of the second cell exceeds a preset load threshold. If the load of the second cell exceeds the preset load threshold, the second base station determines that the RB between the first base station and the UE cannot be accepted; or if the load of the second cell does not exceed the preset load threshold, the second base station determines that the RB between the first base station and the UE can be accepted and sends the determining result to the first base station.

Further, the first base station receives the determining result sent by the second base station. If the determining result is that the second base station can accept the RB between the first base station and the UE, the first base station continues to perform soft handover for the UE; or if the determining result is that the second base station cannot accept the RB between the first base station and the UE, the first base station performs handover for the UE according to the existing cell handover method, which is not described in detail herein again.

Step 208: The first base station sends an RB reconfiguration message to the UE, where the RB reconfiguration message carries an identifier of the RB that exists between the first base station and the UE and an identifier of the second cell.

The first base station sends the RB reconfiguration message to the UE to notify the UE that the RB between the UE and the first base station has been transferred to the second base station.

If quality of a signal between the UE and the first base station is so poor that the first base station cannot send the RB reconfiguration message to the UE by using the RB between the first base station and the UE, the first base station may send the RB reconfiguration message to the second base station, and the second base station sends the RB reconfiguration message to the UE.

Further, the first base station may send a MAC CE to the UE, where the MAC CE carries an RB configuration message of the RB that exists between the first base station and the UE.

Step 209: The UE receives the RB reconfiguration message, and determines, according to the RB reconfiguration message, to transmit a service by using the second base station.

Specifically, the UE receives the RB reconfiguration message, and according to the identifier of the RB that exists between the UE and the first base station and the identifier of the second cell that are carried in the RB reconfiguration message, the UE determines that the RB between the UE and the first base station has been transferred to the second base station, and determines to transmit a service by using the second base station.

In this embodiment of the present invention, the UE determines, before the synchronization time or at the synchronization time, to transmit a service by using the second base station.

Further, after determining that the RB between the UE and the first base station has been transferred to the second base station, the UE may disconnect from the first base station.

Further, after determining that the RB between the UE and the first base station has been transferred to the second base station, the UE may send, to the second base station, uplink data that needs to be sent to a core network, and the second base station receives the uplink data and forwards the uplink data to the first base station. The first base station receives the uplink data and sends the uplink data to the core network.

Further, after sending the RB transfer information or after sending the RB reconfiguration message, the first base station sends, to the second base station, downlink data that needs to be sent to the UE. The downlink data that is in the first base station and that needs to be sent to the UE is downlink data sent by the core network.

The second base station receives the downlink data, and sends the downlink data to the UE after the synchronization time by using the RB between the second base station and the UE; and the UE receives the downlink data sent by the second base station.

The second base station sends the downlink data to the UE after the synchronization time by using the RB between the second base station and the UE, and because the UE determines, before the synchronization time or at the synchronization time, to transmit a service by using the second base station, the UE has known that the downlink data is to be received from the second base station, thereby ensuring that the UE can successfully receive the downlink data.

Although the UE disconnects from the first base station after receiving the RB reconfiguration message, because the UE has accessed the second cell and an RB exists between the UE and the second base station, by using the second base station, the UE sends the uplink data to the core network and receives the downlink data sent by the core network. In this way, it can be ensured that a service of the UE is not interrupted.

Step 210: The target base station receives the handover request message, and determines, according to the handover request message, whether the target base station can accept the RB between the first base station and the UE.

Specifically, the target base station receives the handover request message, and according to the handover indication carried in the handover request message, the target base station determines that handover needs to be performed for the UE, acquires load of the target cell, and determines whether the load of the target cell exceeds a preset load threshold. If the load of the target cell exceeds the preset load threshold, the target base station determines that the target base station cannot accept the RB between the first base station and the UE; or if the load of the target cell does not exceed the preset load threshold, the target base station determines that the target base station can accept the RB between the first base station.

Step 211: If the target base station determines that the target base station can accept the RB between the first base station and the UE, the target base station sends a handover request acknowledgement message to the first base station.

If the target base station determines that the target base station cannot accept the RB between the first base station and the UE, the target base station sends a notification message to the first base station. The first base station receives the notification message, and reselects a cell as a target cell according to the measurement report.

Step 212: The first base station receives the handover request acknowledgement message sent by the target base station, and sends a handover request message to the UE, where the handover request message carries a soft handover indication and an identifier of the target cell.

If quality of a signal between the first base station and the UE so poor that the first base station cannot send the handover request message to the UE, the first base station may send the handover request message to the second base station, and the second base station sends the handover request message to the UE.

Step 213: The UE receives the handover request message, and accesses the target cell of the target base station according to the handover request message.

Specifically, the UE receives the handover request message, determines, according to the handover indication carried in the handover request message, that cell handover needs to be performed; and accesses the target cell in accordance with an existing access procedure according to the identifier of the target cell carried in the handover request message.

Step 214: The target base station sends a UE context release message to the first base station.

Step 215: The first base station receives the UE context release message, releases a context of the UE, and sends a primary carrier redirect message to the second base station, where the primary carrier redirect message carries the identifier of the target cell.

In this embodiment of the present invention, the target base station may send, according to the identifier of the second cell, the primary carrier redirect message to the second base station to which the second cell belongs.

Step 216: The second base station receives the primary carrier redirect message, and uses the target cell as a primary carrier cell according to the primary carrier redirect message.

In this embodiment of the present invention, a first base station to which a first cell belongs receives a measurement report obtained by measurement by UE, where the first cell is a primary carrier cell; and if the first base station determines, according to the measurement report, that soft handover needs to be performed for the UE, the first base station transfers an RB between the first base station and the UE to a second base station to which a second cell belongs, selects a target cell according to the measurement report, and hands over the UE to the target cell. Before the UE is handed over to the target cell, the RB between the UE and the first base station is first transferred to the second base station to which the second cell belongs; therefore, in a process in which the UE is handed over to the target cell, interruption of data transmission between the UE and a network side is avoided, thereby avoiding service interruption.

Figure 3:
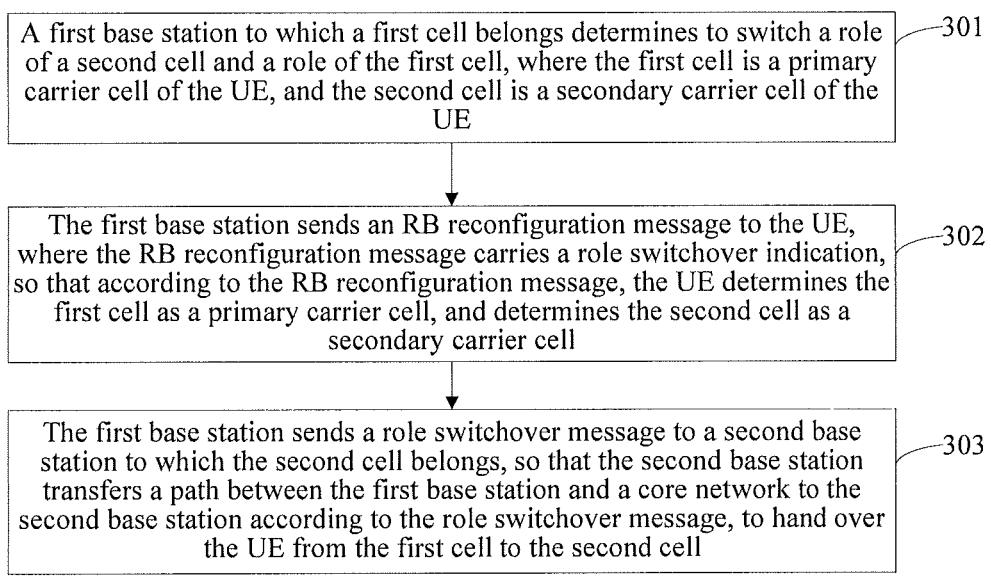
FIG. 3 is a flowchart of another cell handover method according to an embodiment of the present invention.

Referring to FIG. 3, an embodiment of the present invention provides a cell handover method, including:

Step 301: A first base station to which a first cell belongs determines to switch a role of a second cell and a role of the first cell, where the first cell is a primary carrier cell of the UE, and the second cell is a secondary carrier cell of the UE.

Step 302: The first base station sends an RB reconfiguration message to the UE, where the RB reconfiguration message carries a role switchover indication, so that according to the RB reconfiguration message, the UE determines the first cell as a secondary carrier cell and determines the second cell as a primary carrier cell.

Step 303: The first base station sends a role switchover message to a second base station to which the second cell belongs, so that the second base station transfers a path between the first base station and a core network to the second base station according to the role switchover message, to hand over the UE from the first cell to the second cell.

In this embodiment of the present invention, a first base station sends an RB reconfiguration message to UE, where the RB reconfiguration message carries a role switchover indication, so that according to the RB reconfiguration message, the UE determines a first cell as a secondary carrier cell and determines a second cell as a primary carrier cell; and the first base station sends a role switchover message to a second base station to which the second cell belongs, so that the second base station transfers a path between the first base station and a core network to the second base station according to the role switchover message, to hand over the UE from the first cell to the second cell. When the UE is handed over from the first cell to the second cell, the UE maintains connections to the first base station and the second base station all the time, which avoids interruption of data transmission between the UE and a network side, thereby avoiding service interruption.

An embodiment of the present invention provides a cell handover method.

Figure 4:
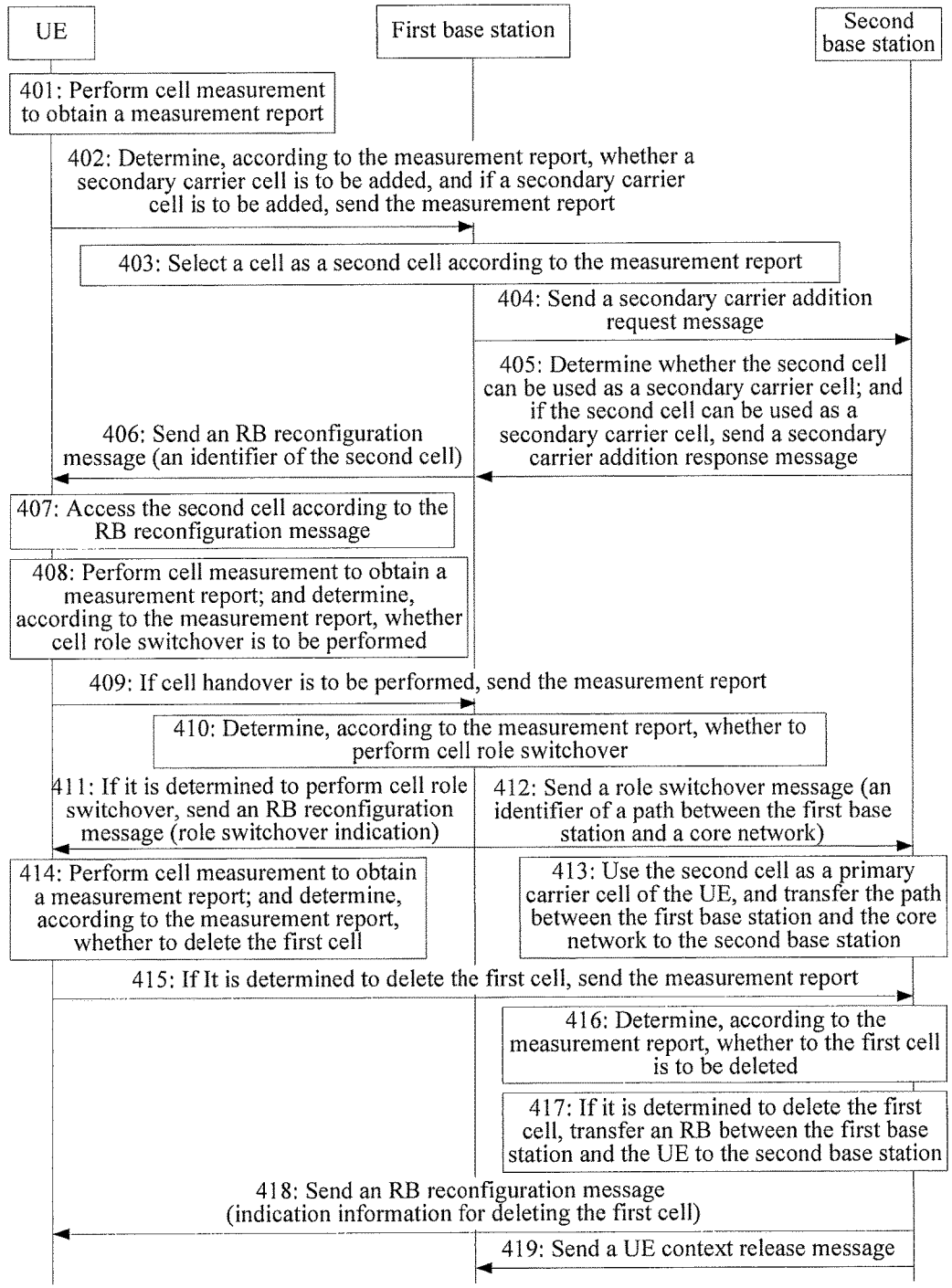
FIG. 4 is a flowchart of another cell handover method according to an embodiment of the present invention.

UE first accesses a first cell and establishes an RB between the UE and a first base station to which the first cell belongs. The UE moves in coverage of the first cell, and when the UE moves to a location at which signal quality of another cell satisfies a specific condition, the UE selects the cell as a second cell, accesses the second cell, and establishes an RB between the UE and a second base station to which the second cell belongs. In this case, the first cell is used as a primary carrier cell of the UE, the second cell is used as a secondary carrier cell of the UE, and the UE enters a CA working state. Referring to FIG. 4, the method includes:

Step 401: UE performs cell measurement to obtain a measurement report, where the measurement report includes signal quality of a cell that can cover the UE.

The cell that can cover the UE includes at least a first cell, and may further include another cell that can cover the UE.

Step 402: The UE determines, according to the measurement report, whether a secondary carrier cell needs to be added, and if a secondary carrier cell needs to be added, the UE sends the measurement report to a first base station to which a first cell belongs.

Specifically, the UE determines, according to the measurement report, whether signal quality of the first cell exceeds a preset quality threshold and whether a cell whose signal quality exceeds the preset quality threshold exists in another cell except the first cell; and if the signal quality of the first cell exceeds the preset quality threshold and a cell whose signal quality exceeds the preset quality threshold exists in the another cell except the first cell, the UE determines that a secondary carrier cell needs to be added, and sends the measurement report to the first base station to which the first cell belongs.

Step 403: The first base station receives the measurement report, and selects a cell as a second cell according to the measurement report.

Specifically, the first base station receives the measurement report, selects, from the another cell except the first cell according to the measurement report, a cell whose signal quality exceeds the preset quality threshold, and uses the selected cell as the second cell.

Step 404: The first base station sends, to a second base station to which the second cell belongs, a secondary carrier addition request message.

Step 405: The second base station receives the secondary carrier addition request message, and determines whether the second cell can be used as a secondary carrier cell of the UE; and if the second cell can be used as a secondary carrier cell of the UE, the second base station sends a secondary carrier addition response message to the first base station.

Specifically, the second base station receives the secondary carrier addition request message, and acquires load of the second cell; and if the load of the second cell does not exceed a preset load threshold, the second base station determines that the second cell can be used as a secondary carrier cell of the UE, and sends the secondary carrier addition response message to the first base station; or if the load of the second cell exceeds a preset load threshold, the second base station determines that the second cell cannot be used as a secondary carrier cell of the UE.

If the second base station determines that the second cell cannot be used as a secondary carrier cell of the UE, the second base station sends a notification message to the first base station. After receiving the notification message, the first base station reselects, from the another cell except the first cell according to the measurement report, a cell whose signal quality exceeds the preset quality threshold, and uses the selected cell as the second cell.

Step 406: The first base station receives the secondary carrier addition response message, and sends an RB reconfiguration message to the UE, where the RB reconfiguration message carries an identifier of the second cell.

Step 407: The UE receives the RB reconfiguration message, accesses the second cell according to the RB reconfiguration message, and uses the first cell as a secondary carrier cell and uses the second cell as a primary carrier cell.

Specifically, the UE receives the RB reconfiguration message, and accesses, by using an existing access procedure, the second cell according to the identifier of the second cell that is carried in the RB reconfiguration message.

After accessing the second cell, the UE enters a CA working state. When the UE needs to send uplink data to the first base station, the UE may send the uplink data to the first base station by using an RB between the UE and the first base station, and the first base station receives the uplink data by using the RB between the first base station and the UE; or the UE may send the uplink data to the second base station by using an RB between the UE and the second base station, the second base station receives the uplink data and forwards the uplink data to the first base station, and then the first base station receives the uplink data. When the first base station needs to send downlink data to the UE, the first base station may send the downlink data to the UE by using the RB between the first base station and the UE, and the UE receives the downlink data by using the RB between the UE and the first base station; or the first base station sends the downlink data to the second base station, the second base station receives the downlink data and sends the downlink data to the UE by using the RB between the second base station and the UE, and the UE receives the downlink data by using the RB between the UE and the second base station.

Preferably, the first base station sends a measurement configuration message to the UE, where the measurement configuration message carries a cell role switchover event, and the cell role switchover event is used to trigger the UE to switch the secondary carrier cell to a primary carrier cell.

The UE receives the measurement configuration message; periodically measures, as instructed by the cell role switchover event carried in the measurement configuration message, signal quality of a cell that can cover the UE, to obtain a measurement report, where the measurement report includes the signal quality of the cell that can cover the UE; and determines, according to the measurement report, whether cell handover is to be performed.

The cell that can cover the UE includes at least the first cell and the second cell, and may further include another cell that can cover the UE except the first cell and the second cell.

Step 408: The UE performs cell measurement to obtain a measurement report, where the measurement report includes signal quality of a cell that can cover the UE; and determines, according to the measurement report, whether cell role switchover needs to be performed.

Specifically, the UE performs cell measurement to obtain the measurement report, determines, according to the measurement report, whether signal quality of the first cell is less than a first preset threshold; and if the signal quality of the first cell is less than the first preset threshold, the UE determines that cell role switchover needs to be performed, or if the signal quality of the first cell is greater than or equal to the first preset threshold, the UE determines that cell role switchover does not need to be performed.

Step 409: If the UE determines that cell role switchover needs to be performed, the UE sends the measurement report to the first base station.

The UE may directly send the measurement report to the first base station by using the RB that exists between the UE and the first base station.

If the signal quality of the first cell obtained by measurement by the UE so poor that the UE already cannot directly send the measurement report to the first base station by using the RB between the UE and the first base station, because the UE is still in coverage of the second cell, the UE may send the measurement report to the second base station by using the RB between the UE and the second base station, and the second base station receives the measurement report, and sends the measurement report to the first base station.

Step 410: The first base station receives the measurement report, and determines, according to the measurement report, whether to perform cell role switchover.

Specifically, the first base station receives the measurement report, and determines whether the signal quality of the first cell is less than the first preset threshold; and if the signal quality of the first cell is less than the first preset threshold, the first base station determines that a status of a channel between the UE and the first base station is relatively poor at present and that cell role switchover needs to be performed; or if the signal quality of the first cell is greater than or equal to the first preset threshold, the first base station determines that a status of a channel between the UE and the first base station is relatively desirable at present and that cell role switchover does not need to be performed.

Step 411: If it is determined to perform cell role switchover for the UE, the first base station sends an RB reconfiguration message to the UE, where the RB reconfiguration message carries a role switchover indication.

Specifically, the first base station determines whether signal quality of the second cell that is included in the measurement report is greater than or equal to a second preset threshold; and if the signal quality of the second cell is greater than or equal to the second preset threshold, the first base station determines that the UE can continue to work in the second cell, and sends the RB reconfiguration message, where the RB reconfiguration message carries the role switchover indication.

If the signal quality of the second cell is greater than or equal to the second preset threshold, it is determined that the UE cannot continue to work in the second cell, and the operation ends.

The UE receives the RB reconfiguration message, and according to the role switchover indication carried in the RB reconfiguration message, uses the second cell as a primary carrier cell and uses the second cell as a secondary carrier cell.

Step 412: The first base station sends a role switchover message to the second base station, where the role switchover message carries an identifier of a path between the first base station and a core network.

The path between the first base station and the core network includes a path on a user plane and a path on a data plane, where the path on the user plane is a path between the first base station and an MME (Mobility Management Entity, mobility management entity) of the core network, and the path on the data plane is a path between the first base station and an SGW (Service Gateway, serving gateway) of the core network.

Step 413: The second base station receives the role switchover message, uses the second cell as a primary carrier cell of the UE, and transfers the path between the first base station and the core network to the second base station according to the role switchover message.

The second base station transfers the path between the first base station and the core network to the second base station in accordance with an existing path transfer procedure according to the identifier, carried in the role switchover message, of the path between the first base station and the core network.

When the UE needs to send uplink data to the core network, the UE may send the uplink data to the second base station by using the RB between the UE and the second base station, and the second base station receives the uplink data by using the RB between the second base station and the UE, and sends the uplink data to the core network; or the UE may send the uplink data to the first base station by using the RB between the UE and the first base station, the first base station receives the uplink data and forwards the uplink data to the second base station, and then the second base station receives the uplink data. When the second base station needs to send downlink data to the UE, the second base station may send the downlink data to the UE by using the RB between the second base station and the UE, and the UE receives the downlink data by using the RB between the UE and the second base station; or the second base station sends the downlink data to the first base station, the first base station receives the downlink data and may send the downlink data to the UE by using the RB between the first base station and the UE, and the UE receives the downlink data by using the RB between the UE and the first base station.

Step 414: The UE performs cell measurement to obtain a measurement report, where the measurement report includes signal quality of a cell that can cover the UE; and determines, according to the measurement report, whether to delete the first cell.

Specifically, the UE performs cell measurement to obtain the measurement report, determines, according to the measurement report, whether signal quality of the first cell is less than a third preset threshold; and if the signal quality of the first cell is less than the third preset threshold, the UE determines that the first cell needs to be deleted, or if the signal quality of the first cell is greater than or equal to the third preset threshold, the UE determines that the first cell does not need to be deleted.

Step 415: If the UE determines to delete the first cell, the UE sends the measurement report to the second base station.

Step 416: The second base station receives the measurement report, and determines, according to the measurement report, whether the first cell needs to be deleted.

Specifically, the second base station receives the measurement report, determines whether the signal quality of the first cell is less than the third preset threshold; and if the signal quality of the first cell is less than the third preset threshold, the second base station determines that the first cell needs to be deleted, or if the signal quality of the first cell is greater than or equal to the third preset threshold, the second base station determines that the first cell does not need to be deleted.

Step 417: If it is determined that the first cell needs to be deleted, the second base station transfers an RB between the first base station and the UE to the second base station.

Specifically, the second base station sends a request message for acquiring an RB to the first base station; the first base station receives the request message for acquiring an RB, and sends RB configuration information of the RB between the first base station and the UE to the second base station; and the second base station receives the RB configuration of the RB between the first base station and the UE, and establishes an RB between the second base station and the UE according to the RB configuration information of the RB between the first base station and the UE, to implement transfer of the RB between the first base station and the UE to the second base station.

Step 418: The second base station sends an RB reconfiguration message to the UE, where the RB reconfiguration message carries indication information for deleting the first cell.

The UE receives the RB reconfiguration message, and disconnects from the first base station as instructed by the indication information that is carried in the RB reconfiguration message and that is used to delete the first cell.

Step 419: The second base station sends a UE context release message to the first base station, so that the first base station releases context information of the UE.

In this embodiment of the present invention, a first base station sends an RB reconfiguration message to UE, where the RB reconfiguration message carries a role switchover indication, so that according to the RB reconfiguration message, the UE determines a first cell as a secondary carrier cell and determines a second cell as a primary carrier cell; and the first base station sends a role switchover message to a second base station to which the second cell belongs, so that the second base station transfers a path between the first base station and a core network to the second base station according to the role switchover message, to hand over the UE from the first cell to the second cell. When the UE is handed over from the first cell to the second cell, the UE maintains connections to the first base station and the second base station all the time, which avoids interruption of data transmission between the UE and a network side, thereby avoiding service interruption.

Figure 5:
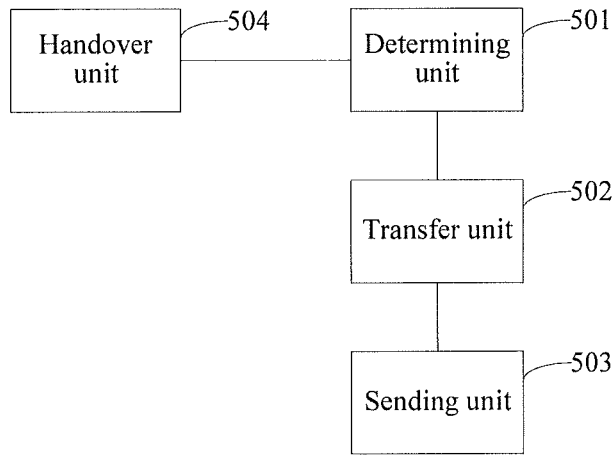
FIG. 5 is a first schematic structural diagram of a base station according to an embodiment of the present invention.

Referring to FIG. 5, an embodiment of the present invention provides a base station, where the base station is a first base station to which a first cell belongs, the first cell is a primary carrier cell of UE, and the base station includes:

a determining unit 501, configured to determine to perform soft handover for the user equipment UE, and select a cell as a target cell for the UE;

a transfer unit 502, configured to: after the determining unit 501 determines to perform soft handover for the UE, transfer a radio bearer RB between the first base station and the UE to a second base station to which a second cell belongs, where the second cell is a secondary carrier cell of the UE;

a sending unit 503, configured to send an identifier of the RB transferred to the second base station by the transfer unit 502 and an identifier of the second cell to the UE, so that the UE determines to transmit a service by using the second base station; and a handover unit 504, configured to: in a case in which the UE maintains the RB with the second cell, hand over the UE to the target cell determined by the determining unit 501.

The handover unit 504 sends a soft handover request message to a target base station to which the target cell belongs, where the soft handover request message carries a soft handover indication, and further, the soft handover request message may further carry an identifier of the second cell.

The target base station receives the handover request message, and determines, according to the handover request message, whether the target base station can accept the RB between the first base station and the UE; and if the target base station determines that the target base station can accept the RB between the first base station and the UE, the target base station sends a handover request acknowledgement message to the handover unit 504 of the base station.

The handover unit 504 receives the handover request acknowledgement message sent by the target base station, and sends a handover request message to the UE, where the handover request message carries a soft handover indication and an identifier of the target cell. The UE receives the handover request message, and accesses the target cell of the target base station according to the handover request message, to implement handover of the UE to the target cell.

Preferably, the transfer unit 502 is configured to send RB transfer information to the second base station, where the RB transfer information carries RB configuration information of the RB between the first base station and the UE, so that the second base station establishes an RB between the second base station and the UE according to the RB transfer information, to implement transfer of the RB between the first base station and the UE to the second base station.

Preferably, the RB transfer information may further carry a synchronization time.

In this embodiment of the present invention, the UE determines, before the synchronization time or at the synchronization time, to transmit a service by using the second base station.

The second base station sends downlink data to the UE after the synchronization time by using the RB between the second base station and the UE, and because the UE determines, before the synchronization time or at the synchronization time, to transmit a service by using the second base station, the UE has known that the downlink data is to be received from the second base station, thereby ensuring that the UE can successfully receive the downlink data.

Preferably, the sending unit 503 is configured to send an RB reconfiguration message to the UE, where the RB reconfiguration message carries the identifier of the RB transferred to the second base station and the identifier of the second cell, so that the UE determines, according to the RB reconfiguration message, to transmit a service by using the second base station;

or the sending unit 503 is configured to send a MAC CE to the UE, where the MAC CE carries the identifier of the RB transferred to the second base station and the identifier of the second cell, so that the UE determines, according to the MAC CE, to transmit a service by using the second base station.

Preferably, the sending unit 503 is configured to send the RB reconfiguration message to the second base station, so that the second base station forwards the RB reconfiguration message to the UE.

Preferably, the sending unit 503 is further configured to send, to the second base station, downlink data that has not been sent to the UE, so that the second base station forwards the downlink data to the UE; and/or the base station further includes:

a receiving unit, configured to receive uplink data sent by the second base station, where the uplink data is uplink data sent by the UE and received by the second base station.

Preferably, the sending unit 503 is further configured to send a primary carrier redirect message to the second base station, where the primary carrier redirect message carries an identifier of the target cell, so that the second base station uses the target cell as a primary carrier cell.

Preferably, the base station further includes:

the receiving unit, configured to receive a measurement report sent by the UE and forwarded by the second base station, where the measurement report includes at least signal quality of a cell that can cover the UE; and the determining unit 501 is configured to determine, according to the measurement report, to perform soft handover for the UE.

The determining unit 501 first determines whether to perform cell handover for the UE, which may be:

determining whether signal quality of the first cell is less than a first preset threshold; and if the signal quality of the first cell is less than the first preset threshold, determining that a status of a channel between the UE and the first base station is relatively poor at present and that cell handover needs to be performed for the UE; or if the signal quality of the first cell is greater than or equal to the first preset threshold, determining that a status of a channel between the UE and the first base station is relatively desirable at present and that cell handover does not need to be performed.

After determining to perform cell handover for the UE, the determining unit 501 then determines whether to perform soft handover for the UE, which may be:

determining, according to the measurement report, whether the UE can continue to work in the second cell; and if the UE can continue to work in the second cell, determining to perform soft handover for the UE; or if the UE cannot continue to work in the second cell, determining not to perform soft handover for the UE.

Preferably, the determining unit 501 determines, according to the measurement report, whether the UE can continue to work in the second cell, which may be:

determining whether signal quality of the second cell included in the measurement report is greater than or equal to a second preset threshold; and if the signal quality of the second cell is greater than or equal to the second preset threshold, determining that the UE can continue to work in the second cell; or if the signal quality of the second cell is less than the second preset threshold, determining that the UE cannot continue to work in the second cell.

In this embodiment of the present invention, a first base station to which a primary carrier cell belongs transfers an RB between the first base station and UE to a second base station to which a secondary carrier cell belongs; sends an identifier of the RB transferred to the second base station and an identifier of the second cell to the UE, so that the UE determines to transmit a service by using the second base station; and hands over the UE to a target cell. Before the UE is handed over to the target cell, the RB between the first base station and the UE is first transferred to the second base station; therefore, in a process in which the UE is handed over to the target cell, interruption of data transmission between the UE and a network side is avoided, thereby avoiding service interruption.

Figure 6:
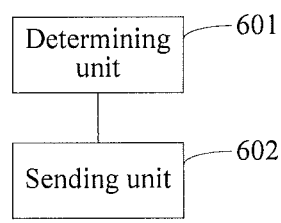
FIG. 6 is a second schematic structural diagram of a base station according to an embodiment of the present invention.

Referring to FIG. 6, an embodiment of the present invention provides a base station, where the base station is a first base station to which a first cell belongs, the first cell is a primary carrier cell of user equipment UE, and the base station includes:

a determining unit 601, configured to determine to switch a role of a second cell and a role of the first cell, where the second cell is a secondary carrier cell of the UE; and a sending unit 602, configured to: after the determining unit 601 determines to switch the role of the second cell and the role of the first cell, send a radio bearer RB reconfiguration message to the UE, where the RB reconfiguration message carries a role switchover indication, so that according to the RB reconfiguration message, the UE determines the first cell as a secondary carrier cell and determines the second cell as a primary carrier cell, where the sending unit 602 is further configured to send a role switchover message to a second base station to which the second cell belongs, so that the second base station transfers a path between the first base station and a core network to the second base station according to the role switchover message, to hand over the UE from the first cell to the second cell.

The determining unit 601 receives the measurement report, and determines, according to the measurement report, whether to perform cell role switchover, which may be:

receiving, by the determining unit 601, the measurement report, and determining whether signal quality of the first cell is less than a first preset threshold; and if the signal quality of the first cell is less than the first preset threshold, determining that a status of a channel between the UE and the first base station is relatively poor at present and that cell role switchover needs to be performed; or if the signal quality of the first cell is greater than or equal to the first preset threshold, determining that a status of a channel between the UE and the first base station is relatively desirable at present and that cell role switchover does not need to be performed.

The sending unit 602 determines whether signal quality of the second cell that is included in the measurement report is greater than or equal to a second preset threshold; and if the signal quality of the second cell is greater than or equal to the second preset threshold, the sending unit 602 determines that the UE can continue to work in the second cell, and sends the RB reconfiguration message, where the RB reconfiguration message carries the role switchover indication.

The UE receives the RB reconfiguration message, and according to the role switchover indication carried in the RB reconfiguration message, uses the second cell as a primary carrier cell and uses the second cell as a secondary carrier cell.

The sending unit 602 sends the role switchover message to the second base station, where the role switchover message carries an identifier of the path between the first base station and the core network.

The path between the base station and the core network includes a path on a user plane and a path on a data plane, where the path on the user plane is a path between the first base station and an MME of the core network, and the path on the data plane is a path between the first base station and an SGW of the core network.

The second base station transfers the path between the first base station and the core network to the second base station in accordance with an existing path transfer procedure according to the identifier, carried in the role switchover message, of the path between the first base station and the core network.

After the UE is handed over from the first cell to the second cell, when the UE needs to send uplink data to the core network, the UE may send the uplink data to the second base station by using an RB between the UE and the second base station, and the second base station receives the uplink data by using the RB between the second base station and the UE, and sends the uplink data to the core network; or the UE may send the uplink data to the first base station by using an RB between the UE and the first base station, the first base station receives the uplink data and forwards the uplink data to the second base station, and then the second base station receives the uplink data. When the second base station needs to send downlink data to the UE, the second base station may send the downlink data to the UE by using the RB between the second base station and the UE, and the UE receives the downlink data by using the RB between the UE and the second base station; or the second base station sends the downlink data to the first base station, the first base station receives the downlink data and may send the downlink data to the UE by using the RB between the first base station and the UE, and the UE receives the downlink data by using the RB between the UE and the first base station.

Preferably, the sending unit is further configured to send, to the second base station, uplink data of the UE that has not been sent, so that the second base station forwards the uplink data to the core network.

Preferably, the base station further includes:

a receiving unit, configured to receive a request message that is sent by the second base station after determining to delete the first cell and that is used to acquire an RB, where the sending unit is further configured to send RB configuration information of the RB between the first base station and the UE to the second base station, so that the second base station establishes the RB between the second base station and the UE according to the RB configuration information of the RB between the first base station and the UE.

In this embodiment of the present invention, a first base station sends an RB reconfiguration message to UE, where the RB reconfiguration message carries a role switchover indication, so that according to the RB reconfiguration message, the UE determines a first cell as a secondary carrier cell and determines a second cell as a primary carrier cell; and the first base station sends a role switchover message to a second base station to which the second cell belongs, so that the second base station transfers a path between the first base station and a core network to the second base station according to the role switchover message, to hand over the UE from the first cell to the second cell. When the UE is handed over from the first cell to the second cell, the UE maintains connections to the first base station and the second base station all the time, which avoids interruption of data transmission between the UE and a network side, thereby avoiding service interruption.

Figure 7:
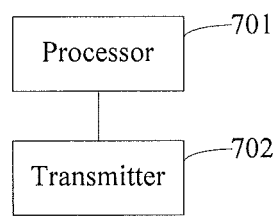
FIG. 7 is a third schematic structural diagram of a base station according to an embodiment of the present invention.

Referring to FIG. 7, an embodiment of the present invention provides a base station, where the base station is a first base station to which a first cell belongs, the first cell is a primary carrier cell of user equipment UE, and the base station includes:

a processor 701, configured to determine to perform soft handover for the user equipment UE, and select a cell as a target cell for the UE; and transfer a radio bearer RB between the first base station and the UE to a second base station to which a second cell belongs, where the second cell is a secondary carrier cell of the UE; and a transmitter 702, configured to send an identifier of the RB transferred to the second base station by the processor 701 and an identifier of the second cell to the UE, so that the UE determines to transmit a service by using the second base station, where the processor 701 is further configured to hand over the UE to the target cell.

The processor 701 sends a soft handover request message to a target base station to which the target cell belongs, where the soft handover request message carries a soft handover indication, and further, the soft handover request message may further carry an identifier of the second cell.

The target base station receives the handover request message, and determines, according to the handover request message, whether the target base station can accept the RB between the first base station and the UE; and if the target base station determines that the target base station can accept the RB between the first base station and the UE, the target base station sends a handover request acknowledgement message to the processor 701 of the base station.

The processor 701 receives the handover request acknowledgement message sent by the target base station, and sends a handover request message to the UE, where the handover request message carries a soft handover indication and an identifier of the target cell. The UE receives the handover request message, and accesses the target cell of the target base station according to the handover request message, to implement handover of the UE to the target cell.

Preferably, the processor 701 is configured to send RB transfer information to the second base station, where the RB transfer information carries RB configuration information of the RB between the first base station and the UE, so that the second base station establishes an RB between the second base station and the UE according to the RB transfer information, to implement transfer of the RB between the first base station and the UE to the second base station.

Preferably, the RB transfer information may further carry a synchronization time.

In this embodiment of the present invention, the UE determines, before the synchronization time or at the synchronization time, to transmit a service by using the second base station.

The second base station sends downlink data to the UE after the synchronization time by using the RB between the second base station and the UE, and because the UE determines, before the synchronization time or at the synchronization time, to transmit a service by using the second base station, the UE has known that the downlink data is to be received from the second base station, thereby ensuring that the UE can successfully receive the downlink data.

Preferably, the transmitter 702 is configured to send an RB reconfiguration message to the UE, where the RB reconfiguration message carries the identifier of the RB transferred to the second base station and the identifier of the second cell, so that the UE determines, according to the RB reconfiguration message, to transmit a service by using the second base station; or the transmitter 702 is configured to send a Media access control layer control element MAC CE to the UE, where the MAC CE carries the identifier of the RB transferred to the second base station and the identifier of the second cell, so that the UE determines, according to the MAC CE, to transmit a service by using the second base station.

Preferably, the transmitter 702 is configured to send the RB reconfiguration message to the second base station, so that the second base station forwards the RB reconfiguration message to the UE.

Preferably, the transmitter 702 is further configured to send, to the second base station, downlink data that has not been sent to the UE, so that the second base station forwards the downlink data to the UE; and/or the base station further includes:

a receiver, configured to receive uplink data sent by the second base station, where the uplink data is uplink data sent by the UE and received by the second base station.

Preferably, the transmitter 702 is further configured to send a primary carrier redirect message to the second base station, where the primary carrier redirect message carries the identifier of the target cell, so that the second base station uses the target cell as a primary carrier cell.

Preferably, the base station further includes:

the receiver, configured to receive a measurement report sent by the UE and forwarded by the second base station, where the measurement report includes at least signal quality of a cell that can cover the UE; and the processor 701 is configured to determine, according to the measurement report, to perform soft handover for the UE.

The processor 701 first determines whether to perform cell handover for the UE, which may be:

determining whether signal quality of the first cell is less than a first preset threshold; and if the signal quality of the first cell is less than the first preset threshold, determining that a status of a channel between the UE and the first base station is relatively poor at present and that cell handover needs to be performed for the UE; or if the signal quality of the first cell is greater than or equal to the first preset threshold, determining that a status of a channel between the UE and the first base station is relatively desirable at present and that cell handover does not need to be performed.

After determining to perform cell handover for the UE, the processor 701 determines whether to perform soft handover for the UE, which may be:

determining, according to the measurement report, whether the UE can continue to work in the second cell; and if the UE can continue to work in the second cell, determining to perform soft handover for the UE; or if the UE cannot continue to work in the second cell, determining not to perform soft handover for the UE.

Preferably, the processor 701 determines, according to the measurement report, whether the UE can continue to work in the second cell, which may be:

determining whether signal quality of the second cell included in the measurement report is greater than or equal to a second preset threshold; and if the signal quality of the second cell is greater than or equal to the second preset threshold, determining that the UE can continue to work in the second cell; or if the signal quality of the second cell is less than the second preset threshold, determining that the UE cannot continue to work in the second cell.

In this embodiment of the present invention, a first base station to which a primary carrier cell belongs transfers an RB between the first base station and UE to a second base station to which a secondary carrier cell belongs; sends an identifier of the RB transferred to the second base station and an identifier of the second cell to the UE, so that the UE determines to transmit a service by using the second base station; and hands over the UE to a target cell. Before the UE is handed over to the target cell, the RB between the first base station and the UE is first transferred to the second base station; therefore, in a process in which the UE is handed over to the target cell, interruption of data transmission between the UE and a network side is avoided, thereby avoiding service interruption.

Figure 8:
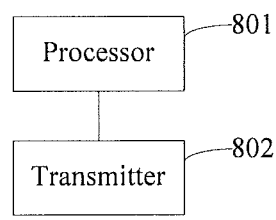
FIG. 8 is a fourth schematic structural diagram of a base station according to an embodiment of the present invention.

Referring to FIG. 8, an embodiment of the present invention provides a base station, where the base station is a first base station to which a first cell belongs, the first cell is a primary carrier cell of user equipment UE, and the base station includes:

a processor 801, configured to determine to switch a role of a second cell and a role of the first cell, where the first cell is a primary carrier cell of the UE, and the second cell is a secondary carrier cell of the UE; and a transmitter 802, configured to: after the processor 801 determines to switch the role of the second cell and the role of the first cell, send a radio bearer RB reconfiguration message to the UE, where the RB reconfiguration message carries a role switchover indication, so that according to the RB reconfiguration message, the UE determines the first cell as a secondary carrier cell and determines the second cell as a primary carrier cell, where the transmitter 802 is further configured to send a role switchover message to a second base station to which the second cell belongs, so that the second base station transfers a path between the first base station and a core network to the second base station according to the role switchover message, to hand over the UE from the first cell to the second cell.

The processor 801 receives the measurement report, and determines, according to the measurement report, whether to perform cell role switchover, which may be:

receiving, by the processor 701, the measurement report, and determining whether signal quality of the first cell is less than a first preset threshold; and if the signal quality of the first cell is less than the first preset threshold, determining that a status of a channel between the UE and the first base station is relatively poor at present and that cell role switchover needs to be performed; or if the signal quality of the first cell is greater than or equal to the first preset threshold, determining that a status of a channel between the UE and the first base station is relatively desirable at present and that cell role switchover does not need to be performed.

The transmitter 802 determines whether signal quality of the second cell that is included in the measurement report is greater than or equal to a second preset threshold; and if the signal quality of the second cell is greater than or equal to the second preset threshold, the transmitter 802 determines that the UE can continue to work in the second cell, and sends the RB reconfiguration message, where the RB reconfiguration message carries the role switchover indication.

The UE receives the RB reconfiguration message, and according to the role switchover indication carried in the RB reconfiguration message, uses the second cell as a primary carrier cell and uses the second cell as a secondary carrier cell.

The transmitter 802 sends the role switchover message to the second base station, where the role switchover message carries an identifier of the path between the first base station and the core network.

The path between the base station and the core network includes a path on a user plane and a path on a data plane, where the path on the user plane is a path between the first base station and an MME of the core network, and the path on the data plane is a path between the first base station and an SGW of the core network.

The second base station transfers the path between the first base station and the core network to the second base station in accordance with an existing path transfer procedure according to the identifier, carried in the role switchover message, of the path between the first base station and the core network.

After the UE is handed over from the first cell to the second cell, when the UE needs to send uplink data to the core network, the UE may send the uplink data to the second base station by using an RB between the UE and the second base station, and the second base station receives the uplink data by using the RB between the second base station and the UE, and sends the uplink data to the core network; or the UE may send the uplink data to the first base station by using an RB between the UE and the first base station, the first base station receives the uplink data and forwards the uplink data to the second base station, and then the second base station receives the uplink data. When the second base station needs to send downlink data to the UE, the second base station may send the downlink data to the UE by using the RB between the second base station and the UE, and the UE receives the downlink data by using the RB between the UE and the second base station; or the second base station sends the downlink data to the first base station, the first base station receives the downlink data and may send the downlink data to the UE by using the RB between the first base station and the UE, and the UE receives the downlink data by using the RB between the UE and the first base station.

Preferably, the transmitter 802 is further configured to send, to the second base station, uplink data of the UE that has not been sent, so that the second base station forwards the uplink data to the core network.

Preferably, the base station further includes:

a receiver, configured to receive a request message that is sent by the second base station after determining to delete the first cell and that is used to acquire an RB, where the transmitter 802 is further configured to send RB configuration information of the RB between the first base station and the UE to the second base station, so that the second base station establishes the RB between the second base station and the UE according to the RB configuration information of the RB between the first base station and the UE.

In this embodiment of the present invention, a first base station sends an RB reconfiguration message to UE, where the RB reconfiguration message carries a role switchover indication, so that according to the RB reconfiguration message, the UE determines a first cell as a secondary carrier cell and determines a second cell as a primary carrier cell; and the first base station sends a role switchover message to a second base station to which the second cell belongs, so that the second base station transfers a path between the first base station and a core network to the second base station according to the role switchover message, to hand over the UE from the first cell to the second cell. When the UE is handed over from the first cell to the second cell, the UE maintains connections to the first base station and the second base station all the time, which avoids interruption of data transmission between the UE and a network side, thereby avoiding service interruption.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A cell handover method, wherein the method comprises:
receiving, by a first base station to which a first cell belongs, a measurement report obtained by user equipment (UE) at the first cell, wherein the measurement report includes signal quality of the first cell, signal quality of a second cell, and an identifier and signal quality of at least one target cell that can cover the UE;
selecting, by the first base station, a target cell for the UE from the at least one target cell when the first base station determines to perform handover for the UE based on the measurement report, wherein the first cell is a primary carrier cell of the UE;
transferring, by the first base station, a radio bearer (RB) of a service between the first base station and the UE to a second base station to which the second cell belongs, wherein the second cell is a secondary carrier cell of the UE;
sending, by the first base station to the UE, a notification that the RB is transferred to the second base station, wherein the notification carries an identifier of the RB transferred to the second base station and an identifier of the second cell, wherein before the UE is handed over to the target cell, the RB between the UE and the first base station is transferred to the second base station to which the second cell belongs; and
handing over, by the first base station, the UE to the selected target cell when the UE maintains the RB transferred to the second base station with the second cell to transmit the service.

2. The method according to claim 1, wherein the transferring, by the first base station, the RB between the first base station and the UE to the second base station to which the second cell belongs comprises:
sending, by the first base station, transfer information to the second base station, wherein the transfer information carries configuration information of the RB between the first base station and the UE, the transfer information is used for the second base station to establish an RB between the second base station and the UE.

3. The method according to claim 1, wherein the identifier of the RB transferred to the second base station and the identifier of the second cell are carried in a reconfiguration message or a media access control layer control element (MAC CE) sent by the first base station.

4. The method according to claim 1, further comprising:
sending, by the first base station to the UE, downlink data that has not been sent to the UE through the second base station, by forwarding the downlink data received from the first base station to the UE.

5. The method according to claim 1, further comprising:
receiving, by the first base station, uplink data from the UE through the second base station, by forwarding the uplink data received from the UE to the first base station.

6. The method according to claim 1, after the handing over, by the first base station, the UE to the target cell, further comprising:
sending, by the first base station, a primary carrier redirect message to the second base station, wherein the primary carrier redirect message carries an identifier of the target cell, the primary carrier redirect message is used for the second base station to determine the target cell as a primary carrier cell of the UE.

7. A base station that is a first base station to which a first cell belongs, the first cell being a primary carrier cell of user equipment (UE), wherein the base station comprises:
a receiver configured to receive a measurement report obtained by the UE at the first cell, wherein the measurement report includes signal quality of the first cell, signal quality of a second cell, and an identifier and signal quality of at least one target cell that can cover the UE;
a processor configured to determine to perform handover for the UE based on the measurement report, select a target cell for the UE from the at least one target cell, and transfer a radio bearer (RB) of a service between the first base station and the UE to a second base station to which the second cell belongs, wherein the second cell is a secondary carrier cell of the UE;
a transmitter, configured to send to the UE a notification that the RB is transferred to the second base station, wherein the notification carries an identifier of the RB transferred to the second base station and an identifier of the second cell, wherein before the UE is handed over to the target cell, the RB between the UE and the first base station is transferred to the second base station to which the second cell belongs; and
the processor is further configured to hand over the UE to the selected target cell when the UE maintains the RB with the second cell to transmit the service.

8. The base station according to claim 7, wherein
the processor is configured to control the transmitter to send transfer information to the second base station, wherein the transfer information carries configuration information of the RB between the first base station and the UE, the transfer information is used for the second base station to establish an RB between the second base station and the UE.

9. The base station according to claim 7, wherein the identifier of the RB transferred to the second base station and the identifier of the second cell are carried in a reconfiguration message or a media access control layer control element (MAC CE) sent by the first base station.

10. The base station according to claim 7, wherein
the transmitter is further configured to send to the UE downlink data that has not been sent to the UE through the second base station, by forwarding the downlink data received from the first base station to the UE.

11. The base station according to claim 7, wherein
the base station further comprises:
a receiver configured to receive uplink data from the UE through the second base station, by forwarding the uplink data received from the UE to the first base station.

12. The base station according to claim 7, wherein
the transmitter is further configured to send a primary carrier redirect message to the second base station, wherein the primary carrier redirect message carries an identifier of the target cell, the primary carrier redirect message is used for the second base station to determine the target cell as a primary carrier cell.

* * * * *